Sept. 29, 1970   A. A. AKIN, JR   3,531,177
BINOCULAR CONSTRUCTION USING PLASTIC FOAM AND MAGNETS
Filed Jan. 26, 1967   2 Sheets-Sheet 2

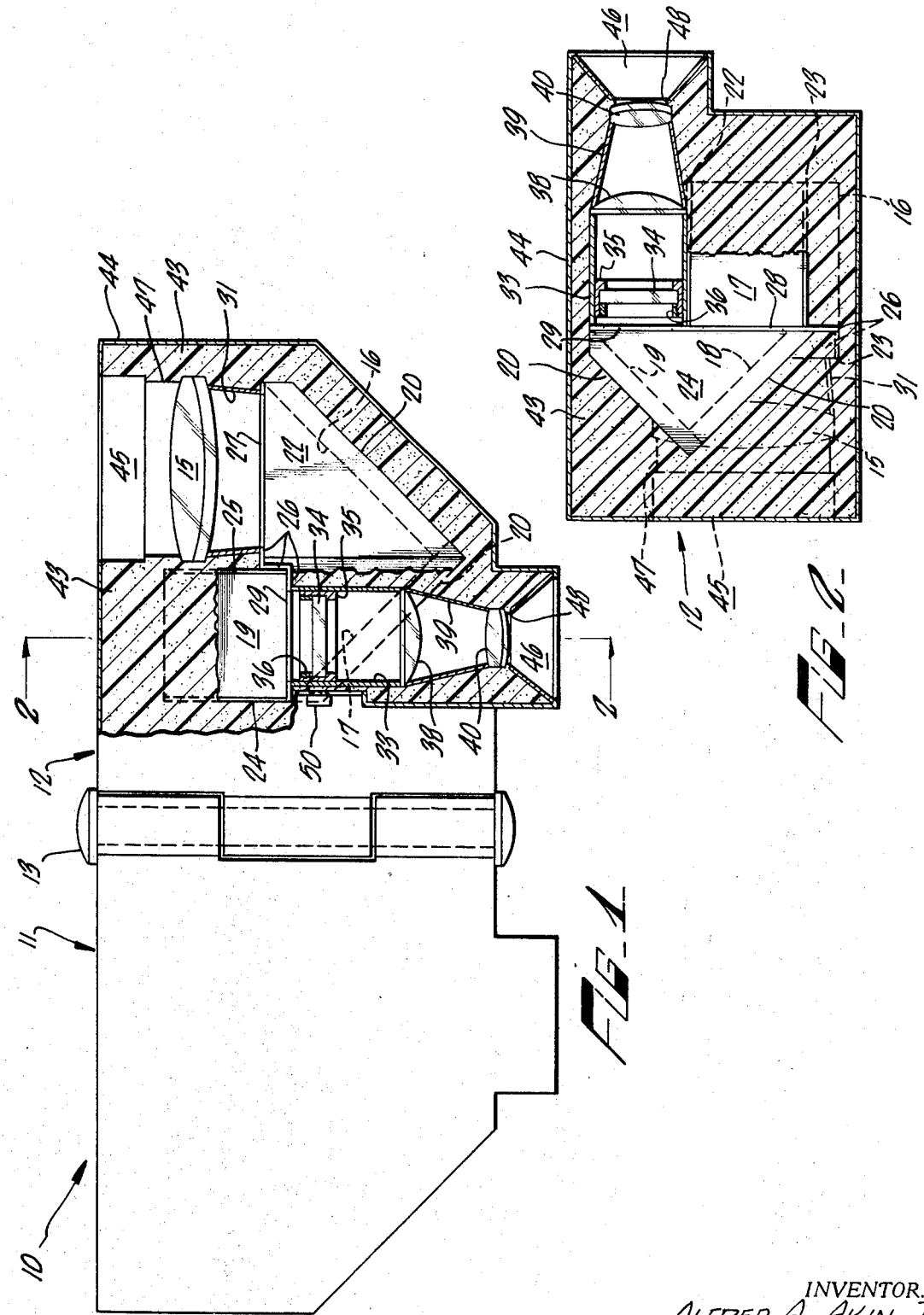

INVENTOR.
ALFRED A. AKIN, JR.
BY
Christie, Parker & Hale
ATTORNEYS.

United States Patent Office 3,531,177
Patented Sept. 29, 1970

3,531,177
BINOCULAR CONSTRUCTION USING PLASTIC FOAM AND MAGNETS
Alfred A. Akin, Jr., West Covina, Calif., assignor to David P. Bushnell, Pasadena, Calif.
Filed Jan. 26, 1967, Ser. No. 611,872
Int. Cl. G02b *21/20, 23/00*
U.S. Cl. 350—36            4 Claims

ABSTRACT OF THE DISCLOSURE

An optical binocular in which optical components including image-erecting prisms or mirrors are mounted in a body of plastic foam material. The foam material is packed in place around the image-erecting system while all the optical elements of the binocular are held in alignment, and hardens to form a permanent support structure. A negative lens is positioned in the binocular housing and is movable to focus the binocular. The negative lens carries a ferromagnetic body, and a magnet is movably mounted on the outside of the housing. The magnet and ferromagnetic body are magnetically coupled whereby changes in position of the magnet cause corresponding changes in position of the negative element to focus the instrument.

BACKGROUND OF THE INVENTION

This invention relates to an optical instrument such as a binocular in which optical elements such as lenses, prisms and mirrors are supported and anchored in place by a plastic foam material. The invention also includes a unique focussing system in which an optical focussing element inside the binocular is magnetically coupled to a movable focussing ring or other body on the outside of the binocular.

Conventional binoculars include a pair of side-by-side monocular optical systems, each of which include an objective lens, an ocular lens, and an image-erecting system positioned between the objective and ocular lenses. These components are typically held in position by a metal framework which includes threaded rings or other locking members to secure the lenses in place. The image-erecting system typically includes a pair of Porro prisms mounted on a cast or sheet-metal shelf. The prisms are usually partially held in place by brackets, and the shelf is normally peened or otherwise distorted to lock the prisms in final alignment after the binocular is collimated.

Although the peened-shelf style of prism mount is in widespread use, it has not been entirely satisfactory from several standpoints. First, if the binoculars are dropped, the sharp shock load impressed on the prisms tends to shift them on the shelf, destroying the optical alignment and collimation of the instrument. Second, peening of the shelf against the prisms tends to set up localized strains in the prism glass. These zones of strain increase the probability that the prisms will break or chip when subjected to shock. Recollimation or replacement of the prisms normally must be done by skilled factory personnel, and is an expensive repair operation for the user.

The binoculars of this invention avoid the aforementioned problems by using a binder material such as a plastic foam which is molded in place around some or all of the optical elements to lock them in a desired alignment. The plastic foam material is especially useful to accommodate the weight and shape of the image-erecting optical system which may include prisms or a set of plane mirrors. This system is coupled to the ocular and objective lenses which may be mounted in conventional metal housings. In another form, the plastic foam material is formed around all the binocular optical components, and all or a substantial part of the metal framework used in conventional designs is eliminated.

The plastic foam construction is inexpensive, and provides a sealed assembly which blocks the entry of moisture into the optical system. The foam material is light weight, and binoculars using this construction will float if accidentally dropped in water, facilitating recovery by the user. The foam material is also a good shock absorber, and can be provided in a black color to absorb stray light inside the binoculars. The foam material is formable around a substantial part of the image-erecting system, and the problem of induced local strains in prisms or mirrors is eliminated. The resulting binocular is thus rugged and durable, and is well adapted to high-quantity manufacturing techniques at low production cost.

SUMMARY OF THE INVENTION

Briefly stated, this invention contemplates an optical instrument such as a binocular which comprises an optical element and a support structure in contact with and extending around a portion of the element to hold the element in a desired alignment. The support structure is formed of a binder material having the property of being initially formable whereby it can be molded around the element to set into a permanent shape to define the support structure. Preferably the binder is an initially flowable plastic which hardens in the form of a cellular foam body. In one form, the binocular includes an image-erecting optical system having sets of Porro prisms or plane mirrors, and the binder material is in supporting contact with at least a portion of the non-transmissive back surfaces of the prisms or mirrors.

BRIEF DESCRIPTION OF THE DRAWINGS

The invention will be described in detail with reference to the attached drawings, in which:

FIG. 1 is a plan view, partly in section, of a mirror binocular constructed according to the invention;

FIG. 2 is a sectional elevation taken on line 2—2 of FIG. 1;

DESCRIPTION OF THE PREFERRED EMBODIMENTS

Figure 3:
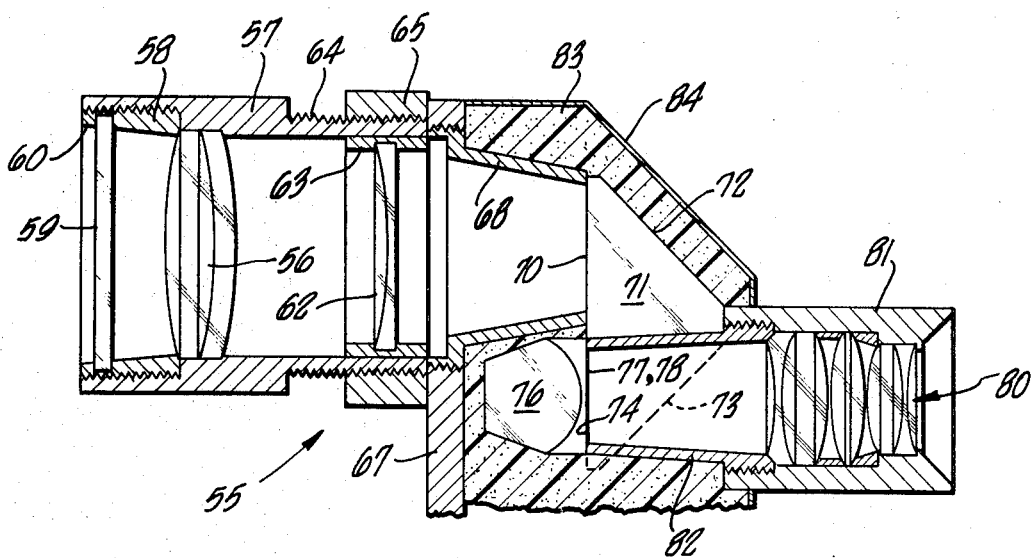
FIG. 3 is a plan view, partly in section, of a prism binocular formed according to the invention.

Referring to FIGS. 1 and 2, a mirror binocular 10 includes two monoculars 11 and 12 secured together by a conventional binocular hinge 13. Monoculars 11 and 12 form the right and left halves of the binocular, and are oppositely oriented but otherwise constructed in the same manner. For brevity, only monocular 12 will be described in detail.

Monocular 12 includes a conventional compound objective lens 15. Light passing through this lens impinges on a series of four front-surfaced plane mirrors 16, 17, 18 and 19 arranged to form an optical image-erecting system for the monocular. Mirrors 16 and 17 are seen edge on in FIG. 1, and are oriented at right angles to each other. Mirrors 18 and 19 are seen edge on in FIG. 2, and are also oriented at right angles to each other. Each of the mirrors has a back surface 20 which does not transmit light, and the edges and back surfaces may be contacted by a support structure to hold the mirrors in place. As suggested in the drawings, mirrors 16–19 respectively may be of decreasing size as the cone of light transmitted by the objective lens steadily decreases in diameter as each successive mirror is reached.

A pair of cover members 22 and 23 extend along opposite side edges of mirrors 16 and 17, and a second pair of cover members 24 and 25 extend along opposite side edges of mirrors 18 and 19. A stepped plate 26 is in contact with the four cover members and extends across the reflecting faces of the four mirrors. Plate 26 has a first circular opening 27 to admit light from the objective lens to mirror 16, a second circular opening 28 to admit light reflected from mirror 17 to mirror 18, and a third circular opening 29 through which light passes after being reflected from mirror 19.

The assembly consisting of the four plane mirrors, the four cover members, and the stepped plate forms a cell around the reflecting front surfaces of the mirrors. Openings 27–29 permit transmission of light into, through and out of the cell. A hollow, truncated conical shell 31 extends from the rear surface of objective lens 15 to stepped plate 26, and is aligned with opening 27 in the stepped plate. The objective lens and conical shell thus extend from the cell to enclose opening 27.

A hollow cylindrical shell 33 extends from plate 26 and is aligned with opening 29 to accept light rays reflected from mirror 19. A negative lens 34 is secured in a mounting ring 35 by a threaded lock ring 36. Mounting ring 35 makes a slip fit within shell 33 whereby the negative lens is movable axially to focus the monocular. A first ocular lens 38 is positioned against an end of shell 33 opposite the end of the shell which contacts plate 26. A second truncated conical shell 39 extends from lens 38 into contact with a second ocular lens 40, and lenses 38 and 40 form an ocular lens system for the monocular. Lenses 38 and 40, and shells 33 and 39 thus cover third circular opening 29 whereby the interior of the aforementioned cell is completely enclosed.

The entire optical assembly of lenses, mirrors and shells just described is covered by a cellular foam body 43 formed of a binder material which is preferably a foaming plastic. The binder material has the property of being initially formable whereby it can be flowed or packed into place around the optical assembly. The binder material then hardens or sets into a cellular foam body as shown in the drawings. This foam body forms a support structure for the optical assembly, and further forms a watertight seal around the optical assembly such that only the outer surfaces of objective lens 15 and ocular lens 40 are exposed to the outside environment.

The outer surface of the cellular foam body is covered with a thin sheet 44 of a plastic material. Sheet 44 is preferably formed of a tough, scuff-resistant and decorative plastic material such as is sold under the trademark "Royalite." The plastic-foam construction results in a lightweight binocular which is capable of floating should the binocular accidentally be dropped into water. Furthermore, the interior of the binocular is sealed against entry of moisture, dust particles, and the like. A polyurethane-foam plastic is suitable to form body 43, and other foaming plastic materials may also be used for this purpose.

Before the cellular foam body is formed, the various optical components in the binocular are aligned and collimated. With the optics held in this desired position, the binder material is then flowed or packed around the components of the optical assembly, and preferably is formed in a shell mold (not shown) surrounding the optical assembly. The mold is of course shaped to provide a desired outer contour for the binoculars. The mold includes a pair of plugs (not shown) fitting against objective lens 15 and ocular lens 40 to shield the outer faces of the lenses from the binder material, and to form passages 45 and 46 extending respectively from the outer faces of the lenses. The plugs are shaped to form annular rings 47 and 48 in the cellular foam body which bear against lenses 15 and 40 respectively to anchor the lenses in place.

In a preferred form of the binocular, a focus adjusting means such as a bar magnet 50 is slidably mounted on the outer surface of the binocular adjacent negative lens 34 to be movable parallel to the optical axis of lens 34. Mounting ring 35 which holds the negative lens is formed of a ferromagnetic body, and is preferably a ring magnet. Magnetic lines of force couple these elements whereby motion of the bar magnet causes the mounting ring and negative lens to move parallel to the optical axis of the negative lens whereby the binocular can be focused.

FIG. 3 shows another form of the invention in which a binocular 55 incorporates a set of conventional Porro prisms to form an image-erecting optical system. Binocular 55 includes an objective lens 56 held in a conventional lens barrel 57 by a lock ring 58 threaded into the end of the lens barrel. A cover glass 59 having plane-parallel faces is held in place at the end of the barrel by a threaded lock ring 60, and serves to protect the outer face of the objective lens.

A foucussing element such as a negative lens 62 is positioned behind the objective lens and is secured in a mounting ring 63 which makes a slip fit against the inside surface of lens barrel 57. The mounting ring and negative lens are thus movable parallel to the axis of the negative lens whereby the binocular can be focused. An outer annular surface of the lens barrel adjacent mounting ring 63 is necked down in diameter and defines a multiple-lead thread 64. A ring magnet 65 is internally threaded to mate with thread 64, and is screwed on the lens barrel. Mounting ring 63 is formed of a ferromagnetic material, and is preferably magnetized. The magnetic lines of force coupling the mounting and ring magnet thus permit focusing of the binocular as the mounting ring and negative lens follow the axial motion of the ring magnet as it is rotated on the lens barrel.

A portion of lens barrel 57 extending rearwardly (to the right as seen in FIG. 3) from threads 64 is necked down and threaded into a mounting plate 67. A rearwardly extending truncated conical shell 68 is integrally formed with the lens barrel, and extends through the mounting plate. The end of conical shell 68 abuts an entrance face 70 of a conventional first Porro prism 71. The Porro prism has the property of total internal reflection whereby light transmitted through entrance face 70 is totally reflected at back surfaces 72 and 73 of the prism, and finally transmitted through an exit face 74 of the prism. The prism thus laterally shifts and reverses the direction of the light rays.

Figure 4:
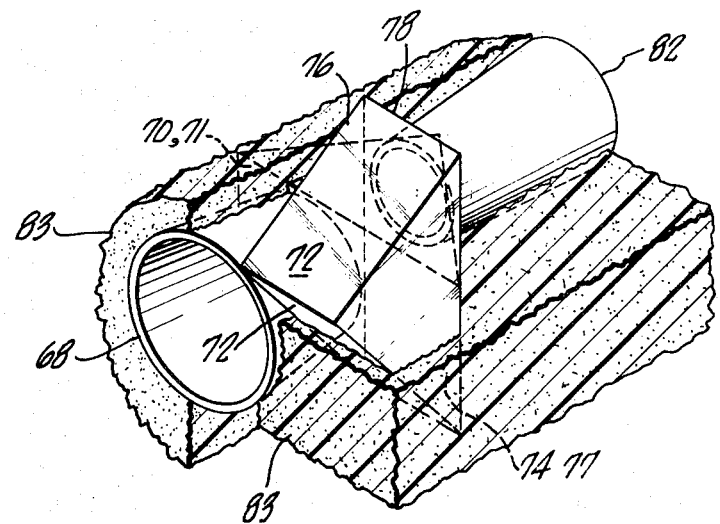
FIG. 4 is a perspective view of the Porro prisms and mounting components.

A second Porro prism 76 has an entrance face 77 positioned against exit face 74 of the first Porro prism. As best seen in FIG. 4 (where all prism faces are shown as planar for clarity) these two prisms are mounted at right angles to each other as is conventional in prism binoculars. Light transmitted through entrance face 77 of the second Porro prism is twice internally reflected, and is transmitted through an exit face 78 to an ocular lens system 80. The several optical elements in the ocular lens system are mounted in a conventional lens barrel 81, and the barrel is threaded on one end of a truncated conical shell 82 which extends toward second Porro prism 76 to abut exit face 78.

After the various optical components in binocular 55 are aligned and collimated, a binder material such as a foaming plastic is packed or molded around and against the non-transmissive side and back surfaces of the two Porro prisms, and also against lens barrel 57, mounting plate 67, conical shells 68 and 82, and lens barrel 81 as shown in FIG. 3. The binder material is allowed to set or harden to form a cellular foam body 83 which structurally supports and locks in place the two Porro prisms. Body 83 is in direct contact with the side and back surfaces of the Porro prisms, and forms a secure, shock-resisting support for these components.

Preferably, the outer surface of foam body 83 is covered with a sheet 84 of a plastic material as described above in connection with sheet 44. As already described, a binder material such as polyurethane foam is suitable to form body 83, and other types of foaming plastic materials are also suitable for this purpose.

Binocular 55 of course includes two monoculars as shown in FIG. 1, and the monoculars are joined by a hinged joint (not shown) to provide an adjustable interocular spacing between the monoculars. The second monocular of binocular 55 is formed just as described above, and, for brevity, will not be described in detail.

There has been described a binocular which incorporates a plastic foam body as a structural element to support the various optical components. This construction has the advantage of being lightweight, buoyant, and inexpensive, while at the same time providing a rugged shock-resistant assembly which will withstand rough treatment.

What is claimed is:

1. An optical binocular having a pair of monoculars and means for connecting the monoculars together, each monocular having a multisurface image-erecting optical system positioned between and air-spaced from an objective lens and an ocular lens, the objective and ocular lenses being mounted in respective housings, the housings each including a hollow shell extending therefrom toward the erecting system and extending around optical paths between the lenses and erecting system, and a support structure for the erecting system comprising a body of cellular plastic-foam binder material formed around and in contact with at least two surfaces of the erecting system whereby the erecting system is clamped therein, the binder material being formed on outer surfaces of the shells to extend between the lens housings outside of the optical paths from the lenses to the erecting system to support and position the erecting system in optical alignment with the lenses, the cellular plastic-foam binder material being of sufficiently low density that the assembled binocular will float in water.

2. The optical binocular defined in claim 1 in which the image-erecting optical system comprises a plurality of plane mirrors having back surfaces, and the binder material is in supporting contact with at least a portion of the back surfaces.

3. The optical binocular defined in claim 1 in which the image-erecting optical system comprises a pair of Porro prisms, each prism having non-transmissive back surfaces, and the binder material is in supporting contact with at least a portion of the back surfaces.

4. The optical binocular defined in claim 3 in which the plastic is a foamed polyurethane plastic, and further comprising a plastic sheet material secured to an outer surface of the support structure formed by the binder material.

References Cited

UNITED STATES PATENTS

| 2,328,603 | 9/1943 | Bennett et al. | 250—36 |
| 2,940,359 | 6/1960 | Rantsch | 350—36 |
| 3,383,152 | 5/1968 | Ward | 350—61 |
| 2,364,811 | 12/1944 | Perkins | 350—67 |

FOREIGN PATENTS

| 551,479 | 2/1943 | Great Britain. |
| 678,764 | 6/1939 | Germany. |
| 1,106,618 | 7/1955 | France. |

PAUL R. GILLIAM, Primary Examiner

U.S. Cl. X.R.

350—44, 67